July 9, 1963  R. W. GUSTAFSON  3,096,811
SAFETY CONTROL SYSTEM FOR FLUID FUEL BURNERS
Filed July 20, 1961
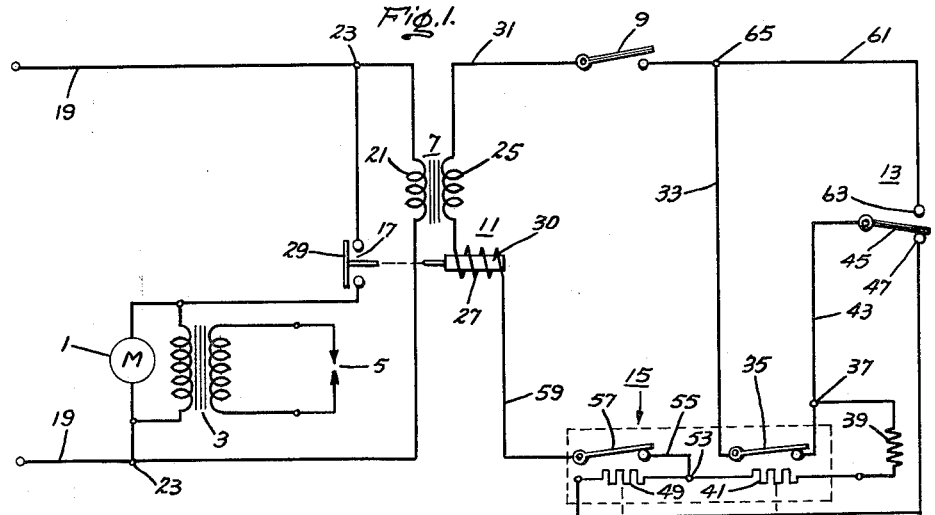
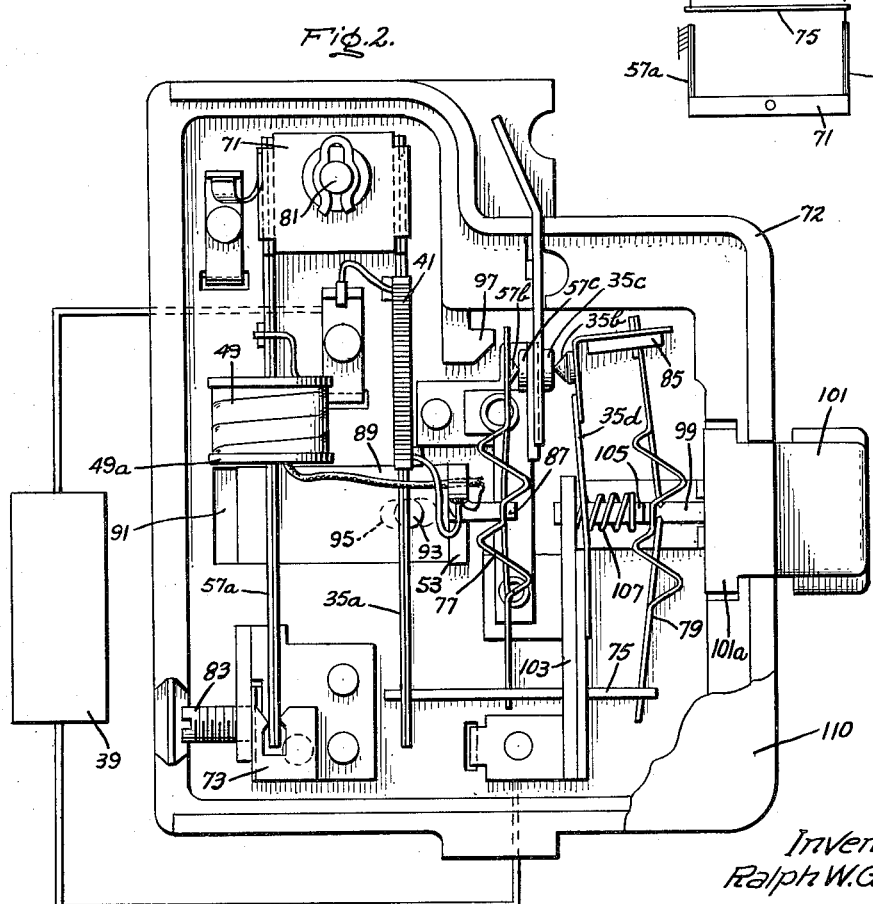
Inventor:
Ralph W. Gustafson,
by Thomas A. Briody
Attorney.

3,096,811
SAFETY CONTROL SYSTEM FOR FLUID
FUEL BURNERS
Ralph W. Gustafson, Morrison, Ill., assignor to General
Electric Company, a corporation of New York
Filed July 20, 1961, Ser. No. 125,495
4 Claims. (Cl. 158—28)

My invention relates to control systems and apparatus for fluid fuel burners and the like, and more particularly to control systems of the thermal timing type in which the events in the operating and protective sequences are timed by electrically heated thermal timers.

It is a general object of my invention to provide a new and improved fluid fuel burner control system which is simple and inexpensive in construction, and durable and dependable in operation.

It is a more particular object of my invention to provide in such a system a new and improved lockout and ignition controlling apparatus.

It is a further object of my invention to provide a safety control system for a fluid fuel burner which includes a simplified and efficient means to prevent the burner from starting unless a flame responsive switch is in its starting position.

In carrying out my invention, in one form thereof, I apply it to a control system for a fluid fuel burner. The control system generally comprises: (1) a relay having a single pair of normally open contacts for controlling the burner and a control coil for actuating the contacts of the relay to their closed position, and (2) a means for energizing the control coil, which includes a thermostat; a flame detector switch having a pair of hot side contacts and a pair of cold side contacts; a dual thermal timer having a normally closed lockout switch controlled by a lockout heater, and a normally closed recycling switch controlled by an associated heater; and a limiting resistor. A starting circuit for energizing the relay coil when the thermostat calls for heat comprises the series connection of the thermostat, the recycling switch, and the lockout switch, in series with a parallel circuit connection of the lockout heater and cold side contacts with the recycling switch heater and limiting resistor. An operating circuit for energizing the relay coil comprises the series connection of the thermostat, the hot side contacts, the recycling switch heater, the limiting resistor, and the lockout switch. In this arrangement, the resistance values of the lockout and recycling heaters and the operative structure of the dual thermal timer are arranged so that only the lockout switch can be opened when the starting circuit is completed, and so that the recycling switch is opened after the lockout heater has been open circuited. In such a control system, when the starting circuit is completed and there is an ignition failure, the cold side contacts of the flame detector remain closed and the lockout heater opens the lockout switch to de-energize the relay coil and thereby open the relay contacts. When normal ignition occurs after the starting circuit has been completed, the hot side contacts of the flame detector are closed, the lockout heater is open circuited, and the recycling heater times open the recycling switch to complete the operating circuit and prepare the system for rapid shut down of the burner when the hot side contacts of the flame detector begin to open. The series connection of the limiting resistor and the recycling heater after the lockout heater has been open circuited is arranged to provide an effective impedance which reduces current flow through the relay coil to a value below that required to actuate the relay contacts to their closed position. This circuit feature assures that the burner will not be actuated by the relay unless the flame detector cold side contacts are closed.

Further aspects of my invention will become apparent hereinafter, and the specification concludes with claims particularly pointing out and distinctly claiming the subject matter which I regard as my invention. The invention, as to organization and method of operation, together with further objects and advantages thereof, may best be understood by reference to the following description when taken in conjunction with the accompanying drawing, in which:

FIG. 1 is a schematic circuit diagram of a burner control system embodying my invention; and FIG. 2 is a side elevation view of the dual thermal timing apparatus of FIG. 1.

Referring now to the drawing, and in particular to FIG. 1, I have illustrated a control system for an oil burner apparatus, wherein my invention has been advantageously employed. The oil burner apparatus comprises a burner motor 1, an ignition transformer 3, and a pair of ignition electrodes 5 connected to the secondary of the ignition transformer 3. The operation of the motor 1 and the ignition transformer 3, is in general controlled by transformer 7, a thermostat 9, a relay 11, a flame detector 13, and a dual thermal timing apparatus 15.

As shown in FIG. 1, the motor 1 and ignition transformer 3 are connected for energization in parallel circuit relation through normally open contacts 17 of the relay 11. Through the relay contacts 17, the motor and ignition transformer are connected to a pair of supply conductors 19. The conductors 19 are connected to a source of alternating current supply (not shown) which, for normal home operation, may suitably be of the 120 volt, 60 cycle type.

The transformer 7 comprises a primary winding 21 connected across the supply conductors 19 at terminals 23, and a low voltage secondary winding 25. The secondary winding 25 may suitably provide 24 volts and is connected to be completed through a series circuit including the thermostat 9 and relay coil 27, as shall be further described hereinafter.

To enable my improved burner control system to operate the burner in a simplified, safe, and expeditious manner, as shown in the schematic circuit of FIG. 1, the relay coil 27 of relay 11 actuates but one set of normally open contacts 17. The normally open relay contacts 17 are closed by armature 29, which is picked up by a magnetizable core 30 of relay coil 27 when current flow therethrough has reached a predetermined value.

For starting the burner by my invention, a circuit is provided for actuating the relay coil 27, from one side of the secondary winding 25 and conductor 31 to the thermostat 9. From the other side of the thermostat 9, the circuit passes through conductor 33 and normally closed contacts of recycling switch 35 to common terminal 37. The starting circuit then passes through the parallel combination of a limiting resistor 39 series connected with recycling heater 41, and conductor 43, flame detector movable contact arm 45, and cold side contact 47 connected in series with lockout heater 49 by conductor 51. The other side of the parallel combination is connected to common terminal 53. The starting circuit is then completed through conductor 55, normally closed contacts of lockout switch 57, conductor 59, and relay coil 27, back to the other side of the secondary winding 25. The operation of the starting circuit for my improved burner control system shall be described in detail hereinafter.

If combustion has occurred after the completion of the aforementioned starting circuit, the movable contact arm 45 of the flame detector moves over to engage the hot side contact 63. By my invention when the flame detector reaches this condition, a second circuit is then briefly established for the relay coil 27 from one side of the secondary winding 25, conductor 31 and thermostat 9 to a parallel combination of the hot side flame detector contacts 45, 63 with the recycling switch 35, connected between common terminals 65 and 37. More particularly, the parallel combination of this particular circuit includes for one of its legs, the conductor 61 series connected to hot side contact 63, movable contact arm 45 of the flame detector, and conductor 43. The other leg of this parallel combination comprises conductor 33 in series relationship with the recycling switch 35. From common terminal 37 this circuit then passes through limiting resistor 39, recycling heater 41, conductor 55, lockout switch 57, conductor 59, and relay coil 27, back to the other side of the secondary winding 25. The purpose and operation of this circuit shall be described in detail hereinafter.

After the completion of the starting circuit, if combustion has occurred, and the second circuit (which includes the recycling switch 35 in parallel with the hot side contacts of the flame detector) has been established, to provide for rapid shutdown upon flame failure, my system provides a new and improved operating circuit. This operating circuit is completed by the operation of the recycling heater 41 to time open the recycling switch 35. In particular, the operating circuit for my control system is completed from one side of the secondary winding 25, conductor 31, thermostat 9, and conductor 61 to the hot side contact 63 of the flame detector. From the movable contact arm 45 of the flame detector the operating circuit then passes through conductor 43, terminal 37, limiting resistor 39, heater 41, terminal 53, conductor 55, lockout switch 57, conductor 59, and relay coil 27, back to the other side of the secondary winding 25.

In the foregoing circuit arrangement, which is illustrated schematically in FIG. 1, there are essentially two thermal timers. One of these timers serves as the lockout timer in that the contacts of its switch 57 are normally closed and are opened to effect deenergization of the burner motor 1 and ignition transformer 3. The other thermal timer serves as an ignition or recycling timer, in that the contacts of its switch 35 are normally closed to complete the starting circuit for ignition of the burner through relay coil 27, and they are opened to break down the starting circuit in preparation for fast shutdown on flame failure, or for recycling.

By the inclusion of limiting resistor 39 in series with recycling heater 41, my control system provides an important safety aspect. To prevent the relay coil 27 from picking up armature 29 unless the flame detector switch is in its cold side contacts (i.e., starting) position, a limiting resistor 39 of sufficiently high impedance has been utilized. When the movable arm 45 of the flame detector switch is off the cold side contact 47, the impedance of limiting resistor 39 reduces the current to the relay coil 27 to a value necessary to "hold" in the relay contacts. Insufficient current thus flows to the relay coil 27 to pick up the relay armature 29, but sufficient current is carried through the heater 41 and series resistor 39 to hold the relay armature in its attracted position, if previously picked up.

To explain the operation of my control system shown in FIG. 1, let it first be assumed that with the apparatus in its fully deenergized position (as shown) the thermostat 9 closes in response to a call for heat. Upon closure of the thermostat 9, the starting circuit is completed for the normally open secondary winding 25 through thermostat 9, recycling switch 35, the parallel connection of flame detector cold side contacts and lockout heater 49 with limiting resistor 39 and recycling heater 41, lockout switch 57, and relay coil 27. Upon completion of the circuit through the secondary winding 25, the relay armature 29 is attracted and closes the contacts 17. Closure of the contacts 17 completes an energizing circuit for the burner motor 1 and the primary winding of the ignition transformer 3. Thus, the oil burner is set into operation.

If the oil is properly ignited, the resulting flame heats the flame detector 13 and the movable contact arm 45 leaves the cold side contact 47. Prior to such flame detector contact separation, the lockout heater 49 was energized in parallel with the heater 41 and limiting resistor 39. If at that time no flame had occurred, the lockout timer switch, which is actuated to its open position considerably faster than recycling switch 35 because the lockout heater carries a much higher wattage than the recycling heater under this condition, would have timed open after a predetermined interval, thereby to open the circuit to the relay winding 27 and deenergize the burner. Under normal starting operation, as soon as the cold contacts of the flame detector are separated, the lockout heater 49 is thereby open circuited and the current in the circuit of the relay winding 27 is reduced. This reduced current is sufficient to hold the relay armature 29 in its attracted position, but insufficient to pick up the armature.

If flame continues in the burner uninterrupted, the movable contact arm 45 of the flame detector arrives after a brief interval in engagement with the hot side contact 63. The second circuit, as previously set forth, is then completed for the normally open secondary winding, with conductor 61 and the hot side contacts of the flame detector shunted around the contacts of the recycling switch 35, and the lockout heater 49 open circuited. The recycling heater 41 is now additionally energized by open circuiting the lockout heater 49 and heats up to time the contacts of its switch 35 open. Opening of the switch 35 has no immediate effect because current then flows between the terminals 65 and 37 through conductor 61 and the hot side contacts of the flame detector. However, the opening of switch 35 represents an important safety aspect of the system, in that it prepares the transformer secondary circuit for rapid and immediate shut down upon ignition failure, as shall now become apparent.

Upon the opening of recycling switch 35, the operating circuit for the system, as previously set forth, is then completed for the secondary winding, through thermostat 9, the hot side contact 63, resistor 39, heater 41, lockout switch 57, and relay coil 27. Sufficient current flows through coil 27 to hold in the relay armature, but there is insufficient current flow through coil 27 to pick up the armature. If flame outage then occurs under this circuit condition, the flame detector arm 45 rapidly moves off the hot contact 63 to deenergize relay coil 27 and open the relay contacts 17. The burner system is thus immediately shutdown.

If flame failure is due to some cause other than normal shutdown by the thermostat 9, so that the thermostat 9 is still closed, reengagement of the flame detecor cold contacts will not immediately restart the burner. The necessary delay interval between flame failure and recycling, which interval is allowed for scavenging of combustible gases from the furnace chamber, is controlled by the flame detector position, but dependent upon the condition of the recycling timer. Thus, when flame failure occurs, the operating circuit is opened and the recycling heater 41 thereupon cools off. The recycling switch 35 has previously been opened to provide the operating circuit. When the flame detector leaves its hot side contact, the recycling heater will return the contacts of recycling switch 35 to their normally closed position. After a predetermined time has elapsed the starting circuit for the burner control system will be thereupon reinitiated.

Referring now more particularly to FIG. 2, there is illustrated a preferred form of thermal timer structure embodying my invention. Wherever possible, correlative structural parts of the thermal timer of FIG. 2 have been given reference numerals corresponding to the schematic circuit diagram of FIG. 1. In this timer, the lockout and recycling timers are mechanically interlinked to provide ambient temperature compensation, and protective interlocking of the timer reset mechanism.

The combined recycling and lockout timer 15 comprises a pair of elongated thermally deformable bimetallic strips 35a and 57a, each fixed at one end in cantilever fashion to a pivotally mounted movable supporting block 71 and extending outwardly therefrom in parallel spaced relation. As illustrated, the bimetal strips 35a and 57a are each of the same combination of metals or alloys and have substantially the same cross section. The block 71 is rotatably mounted on a base or housing 72. The free end of bimetallic strip 57a is held fixed relative to the base by means of an adjustable stop 73. The free end of the bimetallic strip 35a is linked by a flat strip of insulating material 75 to a pair of snap acting overcenter mechanisms 77 and 79. The strip 75 serves as an actuator for transmitting motion from the bimetal strips 35a and 57a to the snap acting mechanisms.

Referring now more particularly to FIG. 2, the dual thermal timer 15 is mounted in a base or housing 72 preferably formed of a suitable molded plastic material, open at one side and provided with the necessary abutments, apertures and recesses to accommodate the various parts of the timer. Within the casing 72, the movable supporting block 71 is rotatably mounted upon the pivot pin 81 projecting outwardly from the integral side wall of the casing. The bimetallic strips are disposed in such a manner on block 71 that if the block were held stationary and both strips heated, their free ends would move angularly in the same direction about the pivot pin 81 and block 71. In other words, the bimetallic strips 35a and 57a tend to maintain parallelism when equally heated.

However, the depending or free end of the bimetallic strip 57a is unable to move relative to the casing 72 because it is held fixed in the adjustable stop 73. The stop 73 is arranged to be moved slightly with respect to the casing 72 by a set screw 83.

The overcenter switch mechanisms or members 77 and 79 are each of the integral spring plate type and each comprises a spring plate slotted to provide a pair of outer tension members and a pair of inner aligned compression members, the abutting ends of the compression members pivotally engaging a fixed or normally fixed supporting member. The outer tension strips of each switch member 77 and 79 are crimped to form tension springs which bias the central pivoted compression members to one side or the other of a dead center position. The upper end of the overcenter switch member 77 carries the lockout contact 57b, and the upper end of the overcenter switch member 79 is connected by an insulating link 85 to a cantilever spring contact arm 35d which carries the movable recycling switch contact. It will be understood that other arms such as 35d could serve different switching functions in the device. The lower movable ends of the snap action switch members 77 and 79 are each connected by the actuating link 75 to the depending free end of the bimetallic strip 35a.

The overcenter snap action switch member 77 is pivotally mounted at its center upon stationary but adjustable support 87. The pivotal support 87 is formed as an ear turned out from the projecting arm of an L-shaped mounting bracket 89. The mounting bracket 89 is positioned with one arm of the L lying in a rectangular recess 91 in the integral side wall of the casing 72. The bracket 89 is fixed in position by a bolt 93, and is adjustable within the range permitted by an elongated hole or slot 95 in the casing side wall through which the bolt 93 passes. The contact carrying end of the snap action switch member 77 stops in one direction of movement against a fixed contact 57c and in the other direction of movement against an abutment 97 formed integrally with the casing 72.

The snap action switch member 79 is mounted at its center upon the slidable shank 99 of a reset button 101 which projects through an aperture in the front wall of the casing 72. The head of the reset button 101 is slidably mounted in the front wall of the casing 72, and the inner end of the shank 99 is slidably mounted in an aperture formed at the upper end of an internal insulating support 103. The support or bracket 103 is fixed on the side wall of the casing 72 in substantially parallel spaced relation with the front casing wall. The fixed bracket 103 serves also as a support for the cantilever contact spring 35d. The reset button shank 99 is provided intermediate its ends with a pair of oppositely projecting shoulders 105, and a helical compression spring 107 encircling the shank 99 is disposed between the shoulders 105 and the supporting bracket 103. The spring 107 biases the reset button 99, 101 to a normal position in which a shoulder 101a abuts against the front casing wall. The reset button shank 99 thus serves as a normally stationary support for the snap action switch member 79. The upper end of the switch member 79 is stopped in one direction of movement by engagement of the contact spring 35d with a stationary contact 35c and in the other direction of movement by engagement of the insulating link 85 with the front wall of the casing 72.

The lockout heater 49 is mounted on the bimetallic strip 57a intermediate its ends. In the form of the invention illustrated, the lockout heater 49 is of large diameter relative to the cross sectional area of the bimetallic strip 57a, and is concentrated over a small length of the strip. The heater 49 is wound upon an insulating sleeve 49a. Heater 41 is mounted upon the bimetallic strip 35a intermediate its ends.

In the normal unheated condition of the mechanism shown in the drawing, all the timer contacts (i.e., both the lockout and recycling switch contacts) are closed, so that the overcenter biasing forces of the snap action switch members 77 and 79 are in opposition, i.e., tend to move the switch link 75 in the opposite directions. The bimetallic strips 35a and 57a are so disposed on the movable supporting block 71 that, when heated, the free ends of the strips tend to move toward the right, as viewed in the drawings.

Turning now to a detailed description of the operation of the dual thermal timing apparatus 15, attention is further directed to FIG. 2. When bimetallic strip 57a is heated, it tends to move its depending free end toward the right. Such movement of the end of the strip 57a is, however, restrained by the stop 73 with the result that the strip 57a effects rotation of the pivotally mounted supporting block 71 in a clockwise direction, as viewed in FIG. 2. Such clockwise rotation of the supporting block 71 moves the depending free end of the bimetallic strip 35a to the left, as viewed in FIG. 2. On the other hand, heating of the bimetallic strip 35a causes its free end to move toward the right, thereby tending to counteract the rotative movement of the supporting block 71.

In the preferred timing apparatus of the present invention, the resistance values of the recycling and lockout heaters 41 and 49, as well as the limiting resistor 39 are proportionately chosen so that when both of the heaters 41 and 49 and the resistor 39 are energized, a higher wattage in the lockout heater overpower the relatively lower wattage in the recycling heater. By way of example, approximately three times as much wattage may be put in the lockout heater 49 as is put in the recycling heater 41, when these heaters are connected in parallel fashion. When the starting circuit of my invention is energizing, if ignition fails the cold side contacts of the flame detector remain closed and the relatively high wattage in the lockout heater 49 thereupon overpowers the lower wattage in the recycling heater 41 to cause a net motion of the timer actuator 75 to the left (viewing FIG. 2). This net motion of actuator 75 opens the lockout switch contacts 57b, 57c, thereby deenergizing the control circuit. As shown in FIG. 2, it will be further understood that the lockout switch remains open until the reset button 101 is then normally depressed.

When the starting circuit of my invention is completed and ignition occurs, the flame detector switch 13 as previously set forth moves over to the hot side contact 63. With this condition, the wattage output of recycling heater 41 is sufficient to move the actuator 75 to the right (viewing FIG. 2). This motion of actuator 75 opens the contacts of the recycling switch 35 and thus prepares the system for fast shutdown upon flame failure.

To close the cavity of housing 72 of thermal timer 15, as suggested by FIG. 2, an insulating cover plate 110 is fastened to the open side of the housing.

It will be understood from the foregoing that my new and improved control system for a fuel burner is simple and inexpensive in construction and dependable in operation.

While in accordance with the patent statutes, I have described what at present is considered to be the preferred embodiment of my invention, it will be obvious to those skilled in the art that various changes and modifications may be made therein without departing from my invention, and I therefore aim in the following claims to cover all such equivalent variations as fall within the true spirit the scope of this invention.

What I claim as new and desire to secure by Letters Patent of the United States is:

1. A control system for a fluid fuel burner comprising a relay having contacts for controlling said burner and a control coil for actuating said contacts; means for energizing said control coil comprising a thermostat, a flame detector having hot side contacts and cold side contacts, thermal timer means including a normally closed lockout switch controlled by a lockout heater and a normally closed recycling switch controlled by an associated heater, and a limiting resistor; a starting circuit for energizing said relay coil through said lockout switch, said thermostat and said recycling switch, said starting circuit including said lockout heater and said cold side contacts connected in parallel circuit relation with the recycling switch heater and said limiting resistor; and an operating circuit for energizing said control coil through said lockout switch and said thermostat, said hot side contacts, said recycling switch heater and said limiting resistor; the resistances of said lockout and recycling heaters being proportioned so that only the lockout switch can be opened when said starting circuit is closed, and said recycling switch is opened when said operating circuit is closed, whereby said lockout heater is energized if ignition failure occurs upon completion of the starting circuit to time open said lockout switch and deenergize said relay for shutting down said burner, and said recycling switch heater is energized if ignition occurs upon completion of the starting circuit to time open said recycling switch and break open a portion of said starting circuit in preparation for rapid shutdown if flame failure occurs.

2. A control system for a fluid fuel burner comprising a relay having normally open contacts for controlling said burner and a control coil for actuating said contacts to their closed position; means for energizing said control coil comprising a thermostat, a flame detector having hot side contacts and cold side contacts; thermal timer means including a normally closed lockout switch opened by energization of a lockout heater and a normally closed recycling switch opened by energization of an associated heater with said lockout heater in a deenergized condition, and a limiting resistor; a starting circuit for energizing said relay coil through said lockout switch, said thermostat and said recycling switch, said starting circuit including said lockout heater and said cold side contacts connected in parallel circuit relation with said recycling switch heater and said limiting resistor; an operating circuit for energizing said control coil through said lockout switch and said thermostat, said hot side contacts, said recycling switch heater and said limiting resistor; the resistances of said heaters being proportioned so that only the lockout switch can be opened when said starting circuit is closed, and said recycling switch is opened when said operating circuit is closed, the impedance of said limiting resistor being arranged to prevent the coil of said relay from actuating the contacts thereof to a closed position unless said flame detector is in its cold side contacts position, whereby said lockout heater is energized if ignition failure occurs upon completion of the starting circuit to time open said lockout switch and deenergize said relay for shutting down said burner, said recycling switch heater is energized if ignition occurs upon completion of the starting circuit to time open said recycling switch and break open a portion of said starting circuit in preparation for rapid shutdown if flame failure occurs, and the coil of said relay can only initially energize said burner upon completion of the starting circuit.

3. A control system for a fluid fuel burner comprising a burner circuit for energizing a burner motor and an ignition transformer, said burner circuit including a power supply connected to the primary winding of a transformer by a pair of conductors, a series connection of said motor and a normally open relay switch connected across said conductors, and an ignition transformer connected in parallel with said motor; a relay including a control coil for actuating the contacts of said relay switch to a closed position for energization of said burner circuit; and a means for energizing said control coil comprising a thermostat, a flame detector having hot side contacts and cold side contacts; thermal timer means including a normally closed lockout switch opened by energization of a lockout heater and a normally closed recycling switch opened by energization of an associated heater with said lockout heater in a deenergized condition, and a limiting resistor; a starting circuit for energizing said relay coil through said lockout switch, said thermostat and said recycling switch, said starting circuit including said lockout heater and said cold side contacts connected in parallel circuit relation with said recycling switch heater and said limiting resistor; an intermediate circuit for energizing said relay through said lockout switch, said thermostat and said recycling switch after completion of said starting circuit and the detection of flame at said burner by said flame detector, said intermediate circuit including the hot side contacts of the flame detector connected in parallel circuit relation with said recycling switch, and the series connection of said limiting resistor with said recycling switch heater; and an operating circuit for energizing said control coil through said lockout switch and said thermostat, said hot side contacts, said recycling switch heater and said limiting resistor; the resistances of said heaters being proportioned so that only the lockout switch can be opened when said starting circuit is closed, and said recycling switch is opened in the intermediate circuit to provide said operating circuit, the impedance of said limiting resistor being arranged to prevent the coil of said relay from actuating the contacts thereof to a closed position unless said flame detector is in its cold side contacts position; whereby said lockout heater is energized if ignition failure occurs upon completion of the starting circuit, to time open said lockout switch and deenergize said relay for shutting down said burner, said recycling switch heater is energized if ignition occurs upon completion of the starting circuit, to time open said recycling switch and break open a portion of said starting circuit in preparation for rapid shutdown if flame failure occurs, and the coil of said relay can only initially energize said burner upon completion of the starting circuit.

4. A control system for a fluid fuel burner comprising a relay having contacts for controlling said burner and a control coil for actuating said contacts; means for energizing said control coil comprising a thermostat, a flame detector having hot side contacts and cold side contacts positions, thermal timer means including a normally closed lockout switch controlled by a lockout heater and a normally closed recycling switch controlled by a recycling heater, and a limiting resistor, the recycling switch being connected in said system to prepare said system for recycling upon flame failure after ignition has occurred, starting and operating circuits for energizing said relay coil through said lockout switch, said thermostat and said flame detector, said starting circuit being completed with the flame detector in its cold side contacts position and including said lockout heater in parallel circuit relation with said recycling heater and said limiting resistor, said lockout heater being arranged to time open said lockout switch if ignition failure occurs after completion of said starting circuit, said recycling heater being arranged to time open said recycling switch after ignition has occurred in preparation for recycling, said operating circuit being completed with the flame detector on its hot side contacts position and including said recycling heater and said limiting resistor, the impedance of said limiting resistor being arranged to prevent the coil of said relay from actuating the contacts thereof to a closed position unless said flame detector is in its cold side contacts position.

References Cited in the file of this patent

UNITED STATES PATENTS

| | | |
|---|---|---|
| 2,113,858 | Ray | Apr. 12, 1938 |
| 2,720,254 | Ward | Oct. 11, 1955 |
| 2,720,255 | Bishofberger | Oct. 11, 1955 |